May 9, 1961
A. O. PITNER
2,983,560
ANTIFRICTION BEARING
Filed March 2, 1954
3 Sheets-Sheet 1
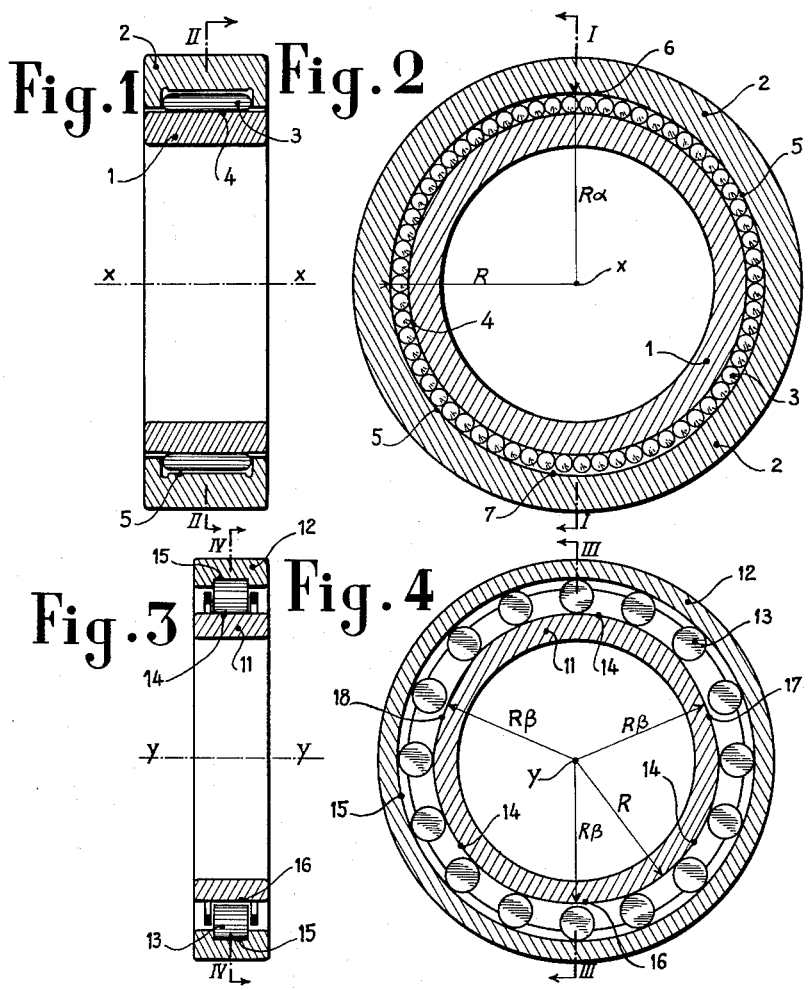
Inventor
Alfred Otto Pitner
By Albert L. Frey
Attorney May 9, 1961 A. O. PITNER 2,983,560
ANTIFRICTION BEARING
Filed March 2, 1954 3 Sheets-Sheet 2
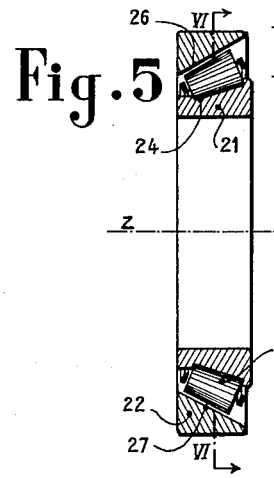
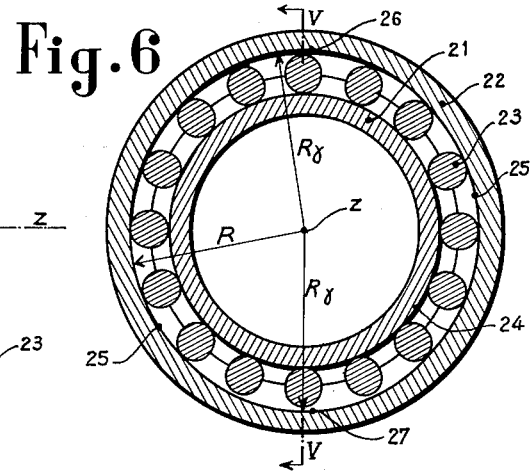
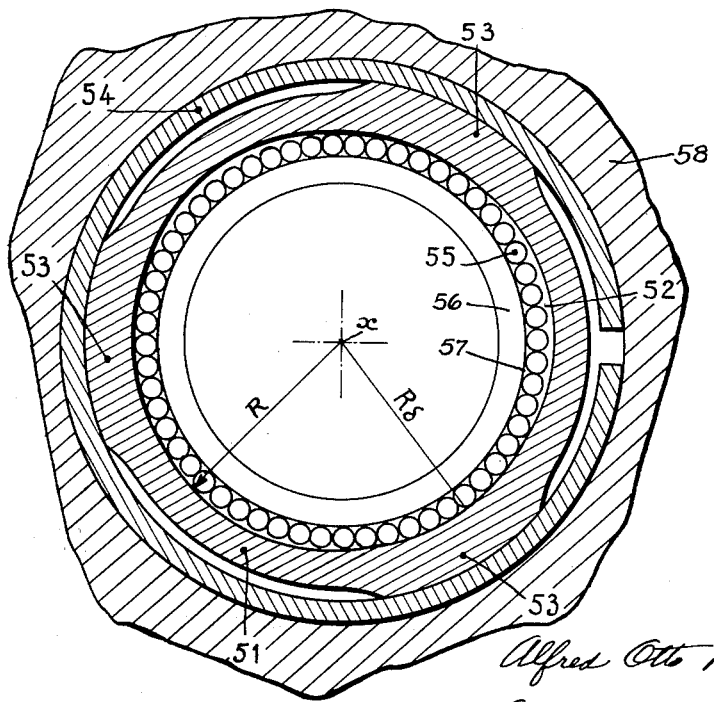
Inventor
Alfred Otto Pitner
By Albert L. Frey Attorney

United States Patent Office 2,983,560
Patented May 9, 1961

2,983,560
ANTIFRICTION BEARING
Alfred Otto Pitner, Paris, France, assignor of one-half to Societe dite: Societe Anonyme des Roulements a Aiguilles, Rueil-Malmaison, France, a corporation of France Filed Mar. 2, 1954, Ser. No. 413,595
Claims priority, application France Mar. 4, 1953
5 Claims. (Cl. 308—202)

The invention relates to bearings of the kind comprising a circular row of rolling members, of generally cylindrical or conical shape, interposed between two rolling races, and more particularly to needle bearings, in which, due to the comparatively small diameter of the needles, the load is transmitted from one race to the other through the maximum number of lines of contact, whereby the stress exerted on a particular rolling member is a minimum.

The manufacturing tolerances and the assembly, mounting and operation of such bearings determine or require a certain amount of play, which is prejudicial to a very precise centering of the rotary shaft or the like within the casing or other stationary structure. Although this play, which amounts to some hundredths of a millimeter in present precision bearings, can be admitted for ordinary uses, there are certain applications (machine-tools adapted to operate with tolerances of the order of magnitude of one to a few microns, optical and other scientific instruments, radar, etc. . . .) where such a play exceeds the limit which corresponds to the desired degree of accuracy.

Attempts have been made to reduce the play in roller and needle bearings by submitting the outer race ring to a general shrinkage or the inner ring to a general expansion, after the bearing is assembled. But this method is objectionable by the fact that, in operation, it will generally be impossible to equalize the thermal expansions of the inner and outer race rings. If the outer race ring expands more than the inner ring, the play will increase and ruin the accuracy. If the inner ring expands more than the outer ring, the very small residual clearance existing between the races and rolling members will tend to zero or to become so-to-speak "negative," the rolling members will undergo considerable stresses and will heat up and the bearing will be rapidly destroyed.

It has already been proposed to provide a roller bearing arrangement in which one of the races is out of round, so that there is an interference fit between the rollers and the races at circumferentially spaced points, to prevent skidding of the individual rollers, when the load is below or above the normal load. This skidding or slipping effect occurs when the cage for the rollers has a tendency to lag and the interference fit has for its purpose to accelerate the rollers and cage to the necessary rotative speed as an individual roller reaches the area of interference fit. According to this prior proposal, the interference fit is defined as a reduction of the spacing between the engaging surfaces of the races, at the points where the interference fit occurs, to a dimension less than the diameter of the roller by from 1 to 2 thousandths of an inch per inch of diameter of the bearing, and this interference fit is produced, either by properly finishing one of the raceways to an out-of-round shape, or by distorting a truly circular race ring. The casing which is adapted to receive such a bearing must be sufficiently flexible so that the race may be sprung slightly as the rollers pass the places where the interference fits occur, in order that the rollers may pass these points without stressing the rollers or the raceways enough to damage either of them.

It will thus be seen that such a roller antiskidding arrangement does not seek and cannot achieve the object of the present invention, viz a very accurate centering of the shaft, because its operativeness is dependent on the existence of a casing having a certain degree of flexibility, i.e. a possibility of distortion, which will depend on the direction and intensity of the load, whereas the very accurate centering of the shaft implies the mounting of the bearing in a casing of such rigidity, at least in the direction of the load, that no distortion or flexion will be possible. Moreover, the stresses set up by an interference fit of the order of .001 to .002 are such that, not withstanding the flexibility of the casing, the maintenance of the bearing at very high speeds and under heavy loads is questionable.

The present invention also embodies the use of an out-of-round raceway to provide local reductions of the space between the raceways, i.e. local areas of reduced clearance for the rollers or needles therebetween, but it is not directly concerned with the elimination of roller skidding or slipping and such reduction of clearance never reaches a so-to-speak "negative" value contrary to the interference fit above referred to. The object of the invention is to locally reduce the clearance to an extent corresponding to the admissible residual play (a few microns in practice), whereby a flexible housing is not required and the bearing can be mounted in a rigid casing, which is an essential condition for securing accurate centering of the shaft.

Another object of the invention is therefore to devise a roller or needle bearing which, when mounted in a rigid casing, will secure a shaft centering with a degree of accuracy which is considerably higher (say ten times) than the accuracy of conventional roller or needle bearings, and which is free of the defects of roller and needle bearings, where the outer race ring has been shrunk or the inner race ring expanded, i.e. bearings in which the reduction of the clearance is uniform along the circumference and the rolling elements are liable to undergo excessive stresses in operation, due to a rise of temperature. In a bearing according to the invention, either a positive clearance occurs everywhere, or the clearance is at rest locally reduced to zero, but, in all cases, the negative clearance which may appear in operation does not exceed the amount corresponding to the thermal expansions in service and can be overcome by infinitely small elastic deformations of the rolling members or of local portions of the raceways, commensurable with those which are inherent in the transmission of the load. The sectors where the rolling members can undergo such elastic deformations have a small circumferential length and, immediately thereafter, the rolling members are relieved and able to cool down, thus eliminating all risk of destruction of the bearing.

The out-of-round raceway may be machined before assembling the bearing and, in such case, the bearing exhibits its property of increased centering accuracy before being mounted in place, and it can be mounted in a cylindrical bore of a casing exactly as a conventional bearing.

According to a modification the out-of-round shape of one of the raceways may be produced by a distortion of the corresponding race ring after fitting into the casing of threading over the shaft, so that the increased centering accuracy does not appear until the bearing is mounted in place.

According to a further modification, the arrangement may be such that the distortion of the race ring is adjustable, thus affording a means of providing a varying degree of centering accuracy corresponding to the use of the bearing and compatible with the speed, load and temperature in service.

Further objects and characteristics of the invention will be apparent from the following description and claims, with reference to the accompanying drawing, in which:

Fig. 1 shows a longitudinal axial section of a needle bearing comprising a ring having an out-of-round outer raceway.

Fig. 2 is a cross section of this bearing taken on the line II—II of Fig. 1.

Fig. 3 is a longitudinal axial section of a roller bearing having a ring with an out-of-round inner raceway.

Fig. 4 is a cross section of the bearing taken on the line IV—IV of Fig. 3.

Fig. 5 is a longitudinal section of a tapered roller bearing having an out-of-round outer raceway.

Fig. 6 is a cross section of the tapered roller bearing taken on the line VI—VI of Fig. 5.

Figure 7:
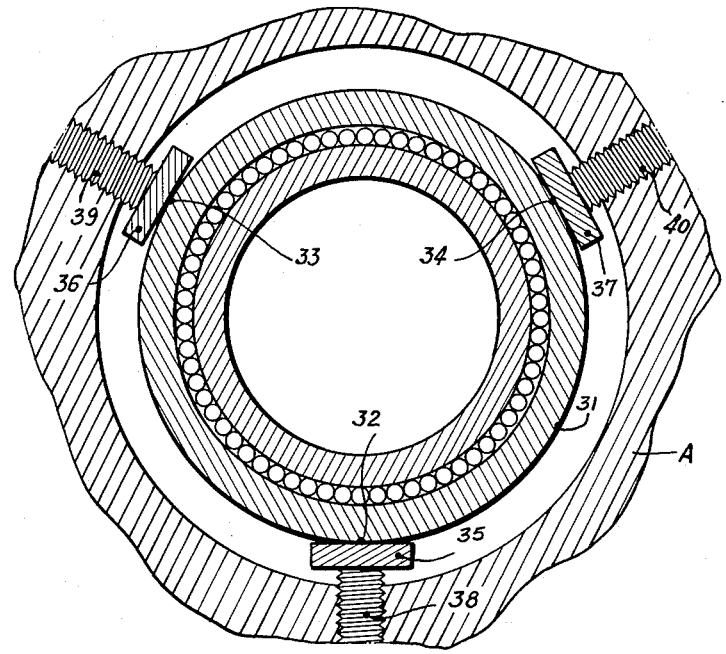
Fig. 7 is a cross section through a conventional needle bearing mounted in a casing provided with adjustable means acting on the outer race ring for deforming the latter.
Figure 8:
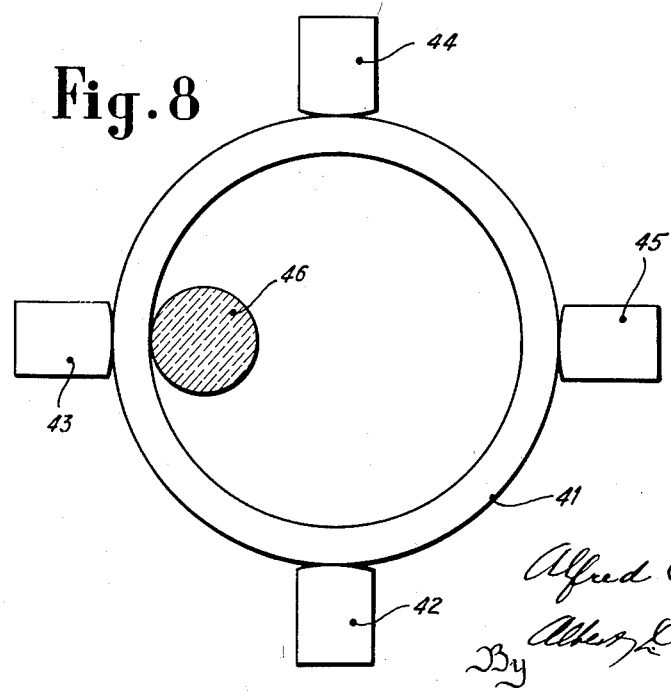

Fig. 8 diagrammatically illustrates a method for machining an out-of-round race ring Fig. 9 is a cross section of a modification of Fig. 7.

In all figures, the departure from the truly circular shape has been strongly exaggerated.

In Figs. 1 and 2, 1 indicates the inner race ring and 2 the outer race ring of a needle bearing, 3 are the needles.

The outer race ring is so machined as to be out-of-round, i.e. in some sectors the radius of the outer raceway as measured from the axis $x$—$x$, is R, and in some other sectors, the radius is $R_a$, greater than R; the inner raceway 4 being truly circular, the spacing between the raceways is smaller opposite sectors 5 and larger opposite sectors 6 and 7, i.e. the clearance for the needles is locally reduced opposite 5 to an extent corresponding to the desired centering accuracy.

In Figs. 1 and 2, two sectors of reduced clearance 5 are shown at the ends of a horizontal diameter, and two sectors of increased clearance 6 and 7 are shown at the ends of a vertical diameter. Such a bearing shall be used in a mechanical structure where the direction of the load is substantially constant and shall be so mounted in the casing that the direction of the load shall always fall within the sectors 5 of reduced clearance. However, such a bearing can also be used in a mechanical structure where the direction of the load is variable, provided at least two such bearings are arranged side by side, with such angular relation of the out-of-round race rings that the sectors of reduced clearance on one out-of-round race ring are angularly displaced with relation to those on the other out-of-round race ring.

In Figs. 3 and 4, the raceway of the inner race ring 11 is out-of-round, and the raceway 15 of the outer race ring 12 is circular. The rolling members are cylindrical rollers 13.

In this embodiment, the inner raceway has three sectors 14, the radius of which, as measured from the axis $y$—$y$, is R, and three sectors 16, 17, 18 the radius of which is $R_\beta$, R being larger than $R_\beta$; therefore, these sectors of reduced clearance are provided opposite raised positions 14.

In Figs. 5 and 6, 21 indicates the inner race ring, having a circular raceway 24, 22 is the outer race ring and 23 are conical rollers.

The outer raceway of race ring 22 comprises sectors 25, where the radius is R, and sectors 26 and 27, the radius $R_\gamma$ of which is greater than the radius R, thus providing sectors of reduced clearance opposite raised portions 25. The bearings shown in Figs. 1 to 6 exhibit their property of increased centering accuracy before being mounted in place.

In the modification of Fig. 7, the bearing is a conventional one, and the property of increased centering accuracy is determined by a distortion of one race ring after being mounted in place, 31 is the outer race ring of a conventional needle bearing mounted on a shaft (not shown); this ring, before distortion, has a truly circular outer raceway, but, after it has been deformed under the action of pressure exerted at three points 32, 33, 34, the corresponding raceway becomes out of round; the pressures are exerted by plates 35, 36, 37 attached to respective screws 38, 39, 40 screwing in a rigid casing or structure A belonging to the mechanical structure where the bearing is being used. By adjusting screws 38, 39, 40, the pressures exerted by the plates are adjustable and thereby the clearance in the corresponding sectors of the bearing can be reduced to the desired extent.

Fig. 8 illustrates a method of producing an out-of-round raceway on a truly circular outer race ring 41. For this purpose, ring 41 is submitted to local elastic deformations on a standard grinding machine by means of clamping jaws such as 42, 43, 44, 45 which produce local raised portions; thus deformed, the ring is trued with a grinding wheel 46, so as to produce a circular inner surface, by grinding away the raised portions. After the ring is released, it resumes its former state and the ground portions form depressions, with intermediate raised portions.

In the embodiment of Fig. 9, 51 indicates an outer race ring, 56 an inner race ring and 55 a circular row of needles. The outer race ring 51, in the free state, has a truly circular inner surface and its outer surface is provided with three bosses 53. Over said bosses is fitted a slit-sleeve 54. Contraction of said sleeve causes distortion of race ring 51, i.e. an elastic deformation thereof due to the inward movement of bosses 53, thus producing on the outer raceway 52 three raised portions, the radius of curvature $R_A$ of which, as measured from axis $x$, is less than the radius of curvature R of the intermediate portions of this raceway; the inner raceway 57 is circular. Contraction of slit sleeve 54 can be produced by any suitable means, such as mounting the whole in a bore of suitable diameter of a rigid casing 58.

This provides means for adjusting to the desired value the radial clearance for the needles opposite the bosses 53.

The invention is not limited to the above-described embodiments and it is clear that the circular raceway may be formed on the corresponding element of the mechanical structure (shaft or bore in the casing).

What I claim:

1. In combination with a rotary shaft and a rigid structure having a bore, an anti-friction bearing fitting in said bore and rotatably supporting said shaft, said bearing comprising an inner race on said shaft and having an outer bearing surface, an outer race rigidly held in said bore and surrounding said inner race and having an inner bearing surface spaced radially from the outer bearing surface of the inner race and a multiplicity of closely spaced rolling members between the bearing surfaces of said races, the bearing surface of at least one of said races being non-circular and having at least three distinct locally raised portions to reduce locally the radial space between said bearing surfaces to a value substantially equal to the diameter of said rolling members, said raised portions being circumferentially spaced from one another and distributed around the periphery of said race and other portions of said bearing surfaces between said raised portions being spaced apart in a radial direction a distance greater than the diameter of the rolling members to provide play between the rolling members and said other portions of the bearing surfaces, there being substantially no play between the rolling members and bearing surfaces at said raised portions and no interference fit producing distortion of the races, whereby said bearing positions said shaft with a high degree of accuracy while affording high speed operation under varying temperature conditions.

2. An anti-friction bearing comprising an inner race having an outer bearing surface and an outer race surrounding said inner race and having an inner bearing surface spaced radially from the outer bearing surface of the inner race and a multiplicity of closely spaced rolling members between the bearing surfaces of said races, the bearing surface of one of said races being non-circular and having at least three distinct locally raised portions to reduce locally the radial space between said bearing surfaces to a value substantially equal to the diameter of said rolling members, said raised portions being circumferentially spaced from one another and distributed around the periphery of said race and other portions of the bearing surfaces between said raised portions being spaced apart in a radial direction a distance greater than the diameter of the rolling members to provide play between the rolling members and said other portions of the bearing surfaces, there being susbtantially no play between the rolling members and bearing surfaces at said raised portions and no interference fit, and means rigidly supporting said one race at said raised portions to support said race against flexing whereby said inner and outer races are centered relative to one another with a high degree of accuracy and substantially without play.

3. An anti-friction bearing comprising an inner raceway and an outer raceway surrounding said inner raceway and spaced radially therefrom and a multiplicity of closely spaced rolling members between said raceways, at least one of said raceways being non-circular and having at least three distinct locally raised portions which reduce locally the radial space between said raceways to a value substantially equal to the diameter of said rolling members, said raised portions being equally spaced circumferentially of said raceway and intervening portions of said raceways between said raised portions being spaced apart in a radial direction a distance slightly greater than the diameter of the rolling members to provide play between the rolling members and said other portions of the raceways, there being substantially no play between the rolling members and raceways at said raised portions and no interference fit, and means supporting said raceways from flexing as said rolling members roll between said raceways at said raised portions, whereby said inner and outer raceways are centered relative to one another with a high degree of accuracy and substantially without play.

4. In combination with a rotary shaft and a rigid supporting structure having a bore, a bearing fitting in said bore and rotatably supporting said shaft, said bearing comprising an inner race on said shaft and having an outer bearing surface, an outer race in said bore and surrounding said inner race and having an inner bearing surface spaced radially from the outer bearing surface of the inner race and a multiplicity of closely spaced rolling members between the bearing surfaces of said races, the bearing surface of said inner race being circular and the bearing surfaces of said outer race being non-circular and having at least three distinct locally raised portions to reduce locally the radial space between said bearing surfaces to a value substantially equal to the diameter of said rolling members, said raised portions being circumferentially spaced from one another and distributed around the periphery of said outer race and other portions of said bearing surfaces between said raised portions being spaced apart in a radial direction a distance greater than the diameter of the rolling members to provide play between the rolling members and said other portions of the bearing surfaces, there being substantially no play between the rolling members and bearing surfaces at said raised portions and no interference fit producing flexing of the races, and means acting between said outer race and rigid supporting structure to support said outer race unyieldingly at said raised portion and variably flex said outer race inwardly at said raised portions to vary the radial distance between said raised portions of the bearing surface of the outer race and the opposed bearing surface of the inner race to maintain said no play relation between the rolling members and bearing surfaces at said raised portions in use, whereby said bearing positions said shaft with a high degree of accuracy throughout the life of the bearing.

5. In combination with a rotary shaft and a rigid supporting structure having a bore, a bearing fitting in said bore and rotatably supporting said shaft, said bearing comprising an inner race on said shaft and having an outer bearing surface, an outer race in said bore and surrounding said inner race and having an inner bearing surface spaced radially from the outer bearing surface of the inner race and a multiplicity of closely spaced rolling members between the bearing surfaces of said races, the bearing surface of said inner race being circular and the bearing surface of said outer race being non-circular and having at least three distinct locally raised portions to reduce locally the radial space between said bearing surfaces to a value substantially equal to the diameter of said rolling members, said raised portions being equally spaced from one another around the periphery of said outer race and intervening portions of said bearing surfaces being spaced apart in a radial direction a distance slightly greater than the diameter of the rolling members to provide play between the rolling members and said intervening portions of the bearing surfaces, and means acting between said outer race and rigid supporting structure to support said outer race unyieldingly at said raised portions and variably flex said outer race inwardly at said raised portions to vary the radial distance between said raised portions of the bearing surface of the outer race and the opposed bearing surface of the inner race to maintain accurate centering of said shaft in said bearing throughout the life of the bearing.

References Cited in the file of this patent

UNITED STATES PATENTS

| Number | Name | Date |
|---|---|---|
| 1,334,027 | Forsberg | Mar. 16, 1920 |
| 1,660,506 | Hamilton | Feb. 28, 1928 |
| 1,978,707 | Gibbons | Oct. 30, 1934 |
| 1,984,718 | Wistrand | Dec. 18, 1934 |
| 2,118,317 | Mader | May 24, 1938 |
| 2,559,621 | Hill | July 10, 1951 |

FOREIGN PATENTS

| Number | Country | Date |
|---|---|---|
| 250,412 | Great Britain | Apr. 15, 1926 |
| 837,249 | France | Nov. 3, 1928 |
| 1,029,486 | France | June 3, 1953 |